Patented Sept. 23, 1941

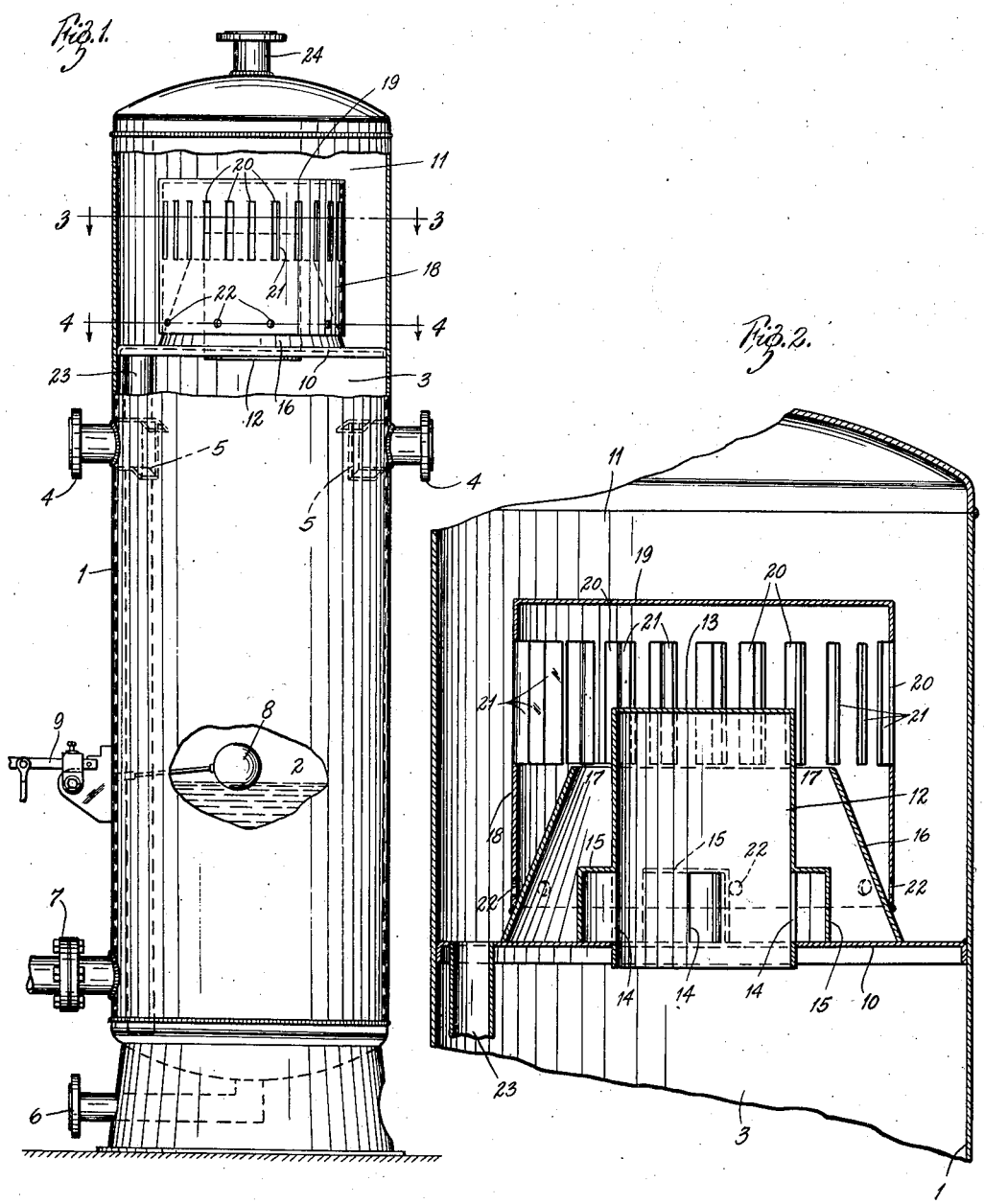

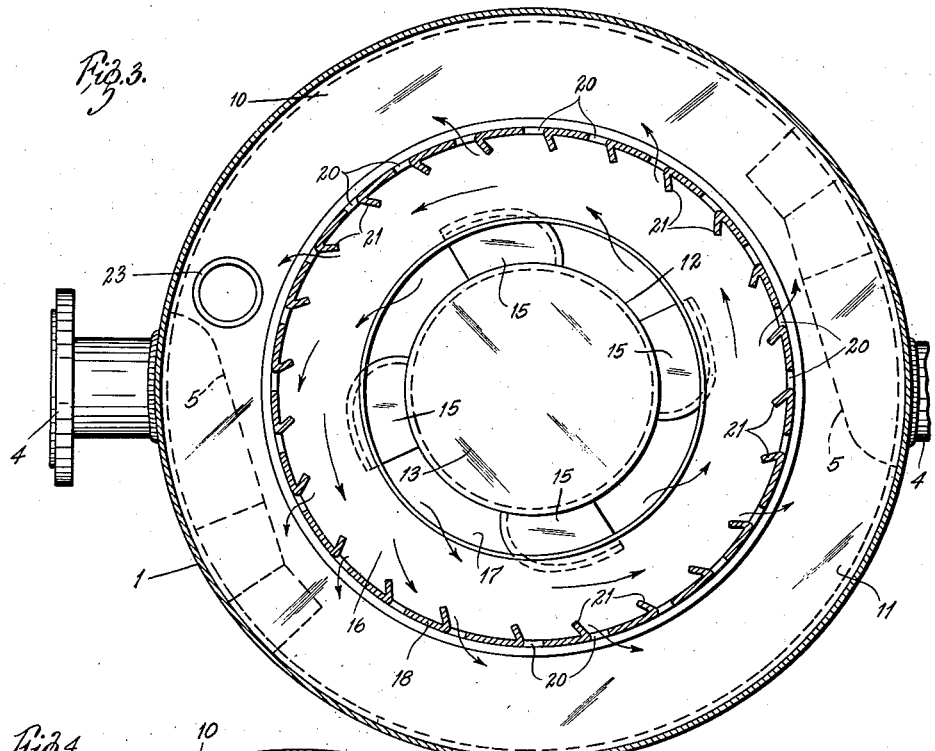
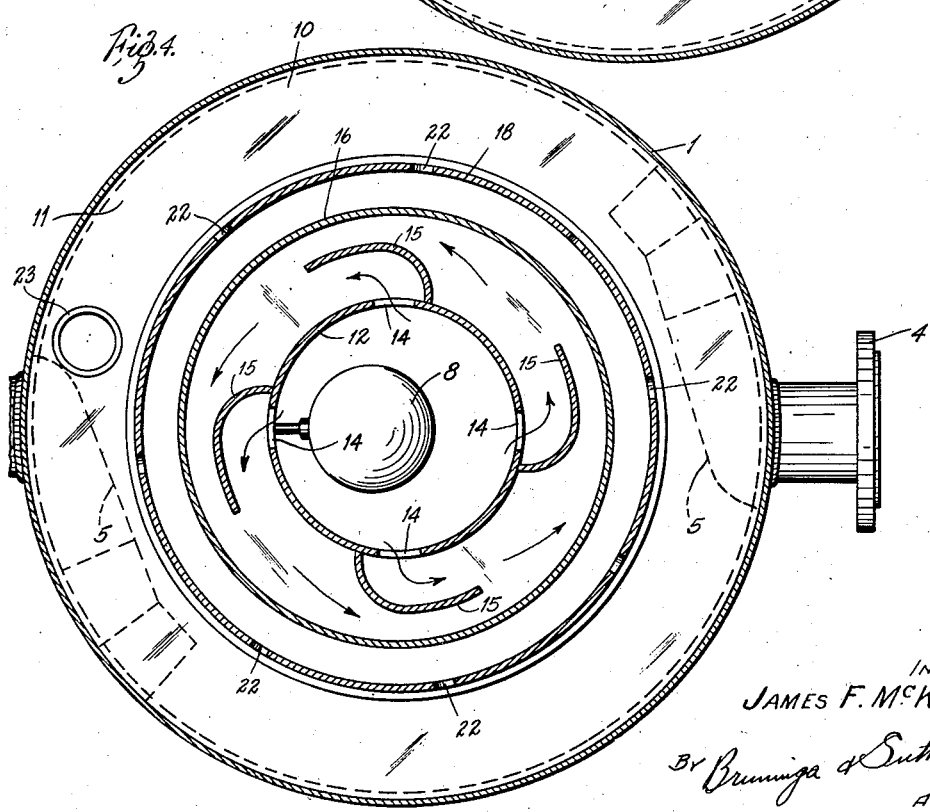

2,256,524

UNITED STATES PATENT OFFICE 2,256,524

OIL AND GAS SEPARATOR

James F. McKelvey, Tulsa, Okla., assignor to Vulcan Steel Tank Corporation, Tulsa, Okla., a corporation of Oklahoma Application May 2, 1940, Serial No. 332,991

7 Claims. (Cl. 183—2.7)

This invention pertains to separators such as are used in separating the gas and oil found in the flow from an oil well, as well as oil and gases as used at refinery and other processing plants.

One of the objects of this invention is to provide improved means for separating from the gaseous constituent of the flow the mist of oil or fine particles of oil carried in suspension in the flowing gas.

Another object is to provide such means which may be mounted in a convenient manner in the separator vessel and which will permit an unobstructed flow of gas therethrough.

Another object is to provide such means whereby a flow of gas at an increased velocity is induced and thereafter the flow is released so as to provide an expansion effect tending to promote the separation or condensation of oil vapor.

Another object is to provide such means whereby a whirling or cyclonic flow is induced and directed against baffle means in order to promote the deposit of the oil particles upon the baffle means.

Further objects will appear from the following description taken in connection with the accompanying drawings, in which:

Figure 1 is a view partly in vertical section of a separator vessel embodying this invention.

Figure 2 is an enlarged detailed of Figure 1.

Figure 3 is an enlarged horizontal section taken on line 3—3 of Figure 1; and

Figure 4 is a similar section taken on line 4—4 of Figure 1.

Referring now to the drawings, I designates a tank which is usually in the form of an upright cylinder. This may be constructed of sheet metal or steel plate, and is arranged so as to provide in the lower portion thereof an oil reservoir, indicated generally at 2, and in the upper portion thereof a gas chamber 3. One or more inlet connections 4 are provided in order to conduct the flow from the well or other sources to the separator. Such flow usually contains oil, gas, water, sand, and other impurities. It is conducted to the tank I by way of the inlets 4. Each inlet may be provided on the inside of the tank I with a directing spout or nozzle 5 directed circumferentially with respect to the tank I, so that the incoming flow will set up a circumferential or whirling movement within the tank.

As the flow enters the tank I the heavier portions, consisting mostly of oil, water, sand, and other impurities in suspension in the flow, fall by gravity to the bottom of the tank and collect in the reservoir 2. These heavier portions stratify to a certain extent with the oil at the top and the sand or sludge at the bottom. The tank I may be provided with a drain connection 6, through which the sludge may be flushed out from time to time. An oil discharge connection 7 is also provided for drawing off the collected oil. In order to keep the oil in the tank at a substantially constant level, a float 8 is usually provided having connections 9 brought to the outside of the tank and connected in any suitable manner, not shown, to operate a valve in the connection 7 so as to discharge oil when the level in the tank rises above a given point.

In the upper portion of the tank I above the inlets 4 a horizontal partition or deck 10 is provided which may be welded to the walls of the tank I so as to form a gas-tight joint. This provides above the partition 10 a separator compartment 11. Extending upwardly through a central opening in the partition 10 is a duct 12 providing an upward passage through said partition. This duct 12 is closed at the top, as indicated at 13. At spaced points around the lower portion of the duct 12 and above the partition 10 said duct is perforated by openings 14 to permit the exit of the gas flow from the duct 12. On the outside of the duct 12 and opposite each of the openings 14 a directing baffle or nozzle 15 is provided so as to cause the outgoing flow to take up a whirling movement.

Mounted in the compartment 11 above the partition 10 flow control means are provided in the form of a conical flow guide 16. This may be mounted upon the partition 10 and secured thereto by welding or otherwise. This flow guide tapers upwardly so as to be narrowest at its upper end, which is open to provide a restricted annular passage 17 between it and the duct 12. Also mounted in the compartment 11 and so as to encompass the flow guide 16 is a baffle 18. In the embodiment illustrated, this baffle is cylindrical in form and closed at its top by a wall 19. The baffle 18 may be mounted upon the partition 10, or, as shown in the drawing, upon the flow guide 16, or in any other suitable manner. The upper part of the vertical wall of the baffle 18, adjacent to the level of the annular opening 17, is perforated by a plurality of elongated openings 20 to permit the escape of the gas from within this baffle to the outer portion of the compartment 11. The openings 20, as shown in the drawings, are in the form of vertical slots, and the material of the wall is bent inwardly at one side of each slot so as to provide an angularly positioned baffle or vane 21. These vanes are positioned so that the flow will impinge upon them so that suspended moisture or oil vapor will be deposited upon these vanes and other portions of the baffle 18.

Means are provided for draining the oil deposited upon the parts 12, 16, and 18. This deposit collects upon the walls and runs down along those walls by gravity. Such liquid collected upon the interior of the flow guide 16 will run down and collect upon the partition 10 and then pass through the openings 14 and downwardly through the duct 12 so as to drip into the reservoir 2. Oil collecting upon the inside of the baffle 18 or the outside of the flow guide 16 will run down those parts and pass through perforations 22 and eventually down upon the partition 10. A pipe 23 may be provided to conduct the collected oil down into the oil compartment 2.

In the operation of this apparatus the flow enters the tank 1 through the inlets 4 and is directed tangentially by the nozzles 5 so as to set up a rotation thereof within the tank 1. Upon entry into the tank the gaseous portions expand and the heavier portions, oil, sand, and water, separate out, as suggested above, and collect in the bottom of the tank where they may be removed as required.

The lighter part of the flow, consisting of gas and suspended moisture and oil particles or vapor, passes upwardly in the chamber 3 continuing its whirling movement and depositing a part of its suspended moisture and oil on the side walls of the tank 1. The gas then passes upwardly through the duct 12 and out through the perforations 14, and the nozzles 15, increasing the velocity, again serve to maintain and increase the whirling or cyclonic movement of the flow. This now whirls within the flow guide 16, again expanding and passing upwardly therein and depositing a further portion of its suspended liquid upon the inner walls of said guide. As this flow passes upwardly within the cone its velocity again increases as it must pass through the restricted passage 17. Immediately beyond the passage 17, however, the area available for the flow is greatly increased. Accordingly, the gas issues from the passage 17 at a high velocity, but that velocity is immediately reduced and an expansion again takes place as the gas flows outwardly from the top of the guide 16. This flow, however, continues to whirl within the baffle 18 so as to tend to throw out its liquid constituent against the wall of said baffle. Further, the whirling flow impinges upon the vanes 21 as the gas exits through the openings 20. This operates to extract further portions of the suspended liquid and the gas issues from the openings 20 into the outer portion of the compartment 11 in a comparatively dry state. The liquid collected upon the baffling walls 12, 16, and 18 flows downwardly and is returned to the oil reservoir 2 in the manner described above.

It can be seen that this invention provides a structure whereby a high percentage of the suspended liquid content of a gas flow of this type may be extracted and the gas delivered in a comparatively dry state. The extraction takes place in successive steps: first, in the chamber 3, then in the duct 12, and then in the flow guide 16. At this point a considerable portion of the liquid content has been extracted. Accordingly, the velocity of flow is increased until it issues at the restricted passage 17, where it is suddenly released so as to induce a certain degree of expansion while, at the same time, the flow is directed against the baffle means 18 and 21, which is interposed in the flow in such a way as to intercept the moisture particles which are deposited upon the baffle means. The gases entering chamber 11 are greatly expanded, releasing any final moisture, the same collecting on the walls 11 and 18, and draining by gravity to deck 10. The dry gas passes out of the upper part of the chamber 11 and is drawn off for any desired purpose through a gas outlet connection 24.

While this invention has been described as embodied in a unitary structure, it will be understood that individual features or sub-combinations thereof may be useful by themselves without reference to other features or to the complete combination, and that the employment of such individual features or sub-combinations is contemplated by this invention when within the scope of the appended claims.

It will be understood further that various changes in the details of construction may be made within the scope of the appended claims without departing from the spirit of this invention, and that the invention is not limited to the specific details shown and described.

The invention having thus been described, what is claimed is:

1. In a separator of the character described, a tank providing an oil reservoir in the lower portion thereof and a gas-accumulating space in the upper portion thereof, inlet means for said tank, a partition or deck in the upper portion of said tank forming thereabove a separator compartment, a duct providing an upward passage through said partition, one or more outlets from said duct arranged to promote a tangential outflow from the lower portion thereof above said partition, an upwardly-tapering flow guide having a restricted upper outlet passage, said flow guide being positioned and arranged to receive the outflow from said outlets and direct the same upwardly through said outlet passage, and baffle means arranged circumferentially with respect to said outlet passage and in the path of the outflow therefrom to intercept and extract liquid suspended in such outflow.

2. In a separator of the character described, a tank providing an oil reservoir in the lower portion thereof and a gas-accumulating space in the upper portion thereof, inlet means for said tank, a partition or deck in the upper portion of said tank forming thereabove a separator compartment, a duct providing an upward passage through said partition, one or more outlets from said duct arranged to promote a tangential outflow therefrom, an upwardly tapering flow guide having a restricted upper outlet passage, said flow guide being positioned and arranged to receive the outflow from said outlets and direct the same upwardly through said outlet passage, an enclosure around said flow guide having a plurality of circumferentially spaced outlet openings opposite said outlet passage, and baffles adjacent said openings to intercept and extract liquid from the gas flow therethrough.

3. In a separator of the character described, a tank providing an oil reservoir in the lower portion thereof and a gas-accumulating space in the upper portion thereof, inlet means for said tank, a partition or deck in the upper portion of said tank forming thereabove a separator compartment, a duct providing an upward passage through said partition, one or more outlets from said duct arranged to promote a tangential outflow therefrom, an upwardly-tapering flow guide having a restricted upper outlet passage, said flow guide being positioned and arranged to receive the outflow from said outlets and direct the same upwardly through said outlet passage, an enclosure around said flow guide having a plurality of circumferentially spaced outlets openings opposite said outlet passage, and baffles adjacent said openings to intercept and extract liquid from the gas flow therethrough, said baffles being positioned to maintain a circumferential flow in said compartment and through said openings.

4. In a separator of the character described, a tank providing an oil reservoir in the lower portion thereof and a gas-accumulating space in the upper portion thereof, inlet means for said tank, a partition or deck in the upper portion of said tank forming thereabove a separator compartment, a duct providing an upward passage through said partition, said duct being closed at its top and having one or more outlets near its bottom above said partition to discharge the flow into said compartment, a conical flow guide in said compartment extending around said outlets to guide the flow upwardly and having a restricted outlet passage at its top, and a perforated baffle wall in said compartment extending around said flow guide opposite said passage and means to direct the flow from said passage against said wall.

5. In a separator of the character described, a tank providing an oil reservoir in the lower portion thereof and a gas-accumulating space in the upper portion thereof, inlet means for said tank, a horizontal partition or deck in the upper portion of said tank forming thereabove a separator compartment, a cylindrical duct extending upwardly through said partition and closed at its top, one or more tangentially-directed outlets in the lower part of said duct above said partition, a conical flow guide extending around said duct and said outlets and tapering upwardly from said partition to a restricted upper outlet passage, a cylindrical baffle wall extending around said outlet passage to intercept and extract suspended liquid from the flow, means to direct the flow from said passage against said wall, and means providing a drain opening between said baffle wall and said flow guide to drain the extracted liquid.

6. In a separator of the character described, a tank providing an oil reservoir in the lower portion thereof and a gas-accumulating space in the upper portion thereof, inlet means for said tank, a horizontal partition or deck in the upper portion of said tank forming thereabove a separator compartment, a cylindrical duct extending upwardly through said partition and closed at its top, one or more tangentially-directed outlets in the lower part of said duct above said partition, a conical flow guide extending around said duct and said outlets and tapering upwardly from said partition to a restricted upper outlet passage, a cylindrical baffle wall extending around said outlet passage to intercept and extract suspended liquid from the flow, and means to direct the flow from said passage against said wall, said baffle wall having perforations and angularly-positioned deflector vanes adapted to direct the flow through said perforations in tangential directions.

7. In a separator of the character described, a tank providing an oil reservoir in the lower portion thereof and a gas-accumulating space in the upper portion thereof, inlet means for said tank, a partition or deck in the upper portion of said tank forming thereabove a separator compartment, a duct providing an upward passage through said partition, one or more outlets from said duct above said partition, flow-controlling guiding means in said compartment positioned outwardly of said duct and above said outlets and arranged to receive directly the outflow from said outlets and guide the same upwardly in said compartment and providing a gradually narrowing passage to increase the velocity of flow, said narrowing passage leading to a restricted outlet for said controlling means, and baffle means in said compartment and above said last outlet in the path of flow therefrom positioned to intercept and extract liquid suspended in such outflow whereby the liquid-laden gas is caused to flow continuously upwardly through said compartment without downward flow.

J. F. McKELVEY.